US012679477B2

(12) United States Patent     (10) Patent No.:   US 12,679,477 B2

Bach et al.     (45) Date of Patent:     Jul. 14, 2026

(54) DIFFUSER DEVICE FOR A MOTOR CAR

(71) Applicant: Mercedes-Benz Group AG, Stuttgart (DE)

(72) Inventors: Ronny Bach, Kirchheim am Neckar (DE); Thomas Benzing, Wildberg (DE); Erich Jehle-Graf, Karlsruhe (DE); Andrej Ruckhaberle, Boeblingen (DE); Uwe Seidler, Boeblingen (DE); Alexander Waeschle, Leonberg (DE)

(73) Assignee: Mercedes-Benz Group AG, Stuttgart (DE)

( * ) Notice: Subject to any disclaimer, the term of this patent is extended or adjusted under 35 U.S.C. 154(b) by 359 days.

(21) Appl. No.: 18/684,450

(22) PCT Filed: Jul. 19, 2022

(86) PCT No.: PCT/EP2022/070206

§ 371 (c)(1),
(2) Date: Feb. 16, 2024

(87) PCT Pub. No.: WO2023/020770

PCT Pub. Date: Feb. 23, 2023

(65) Prior Publication Data

US 2025/0033714 A1     Jan. 30, 2025

(30) Foreign Application Priority Data

Aug. 17, 2021    (DE) .................... 10 2021 004 207.7

(51) Int. Cl.
   *B62D 35/02*     (2006.01)
   *B62D 35/00*     (2006.01)
   *B62D 37/02*     (2006.01)

(52) U.S. Cl.
   CPC ........... *B62D 35/02* (2013.01); *B62D 35/007* (2013.01); *B62D 37/02* (2013.01)

(58) Field of Classification Search
   CPC ....... B62D 35/007; B62D 35/02; B62D 37/02
       (Continued)

(56) References Cited

U.S. PATENT DOCUMENTS 9,527,535 B1    12/2016   Cha et al.
  10,589,804 B2    3/2020   Del Gaizo et al.
       (Continued)

FOREIGN PATENT DOCUMENTS

DE     10 2011 103 787 A1    12/2012
DE     10 2018 202 215 A1     8/2019
       (Continued)

OTHER PUBLICATIONS

International Search Report (PCT/ISA/210) issued in PCT Application No. PCT/EP2022/070206 dated Sep. 20, 2022 (2 pages).
       (Continued)

*Primary Examiner* — Caroline N Butcher

(74) *Attorney, Agent, or Firm* — Crowell & Moring LLP

(57) ABSTRACT

A diffuser device for a motor car includes a diffuser which is moveably held on a base element and an actuator via which the diffuser is movable relative to the base element between a stowed position and a use position. The diffuser has a lower part which is held on the base element such that it is pivotable around a first pivot axis relative to the base element, and an upper part which is held on the base element such that it is pivotable around a second pivot axis relative to the base element, and an intermediate part which is held on the base element such that it is pivotable around a third pivot axis relative to the base element and is respectively shiftably connected to the upper part and the lower part.

10 Claims, 2 Drawing Sheets

(58) Field of Classification Search
 USPC ...................................................... 296/180.5
 See application file for complete search history.

(56) References Cited

U.S. PATENT DOCUMENTS

| | | | |
|---|---|---|---|
| 2014/0097638 A1* | 4/2014 | Froling .................. | B62D 35/02 |
| | | | 296/180.1 |
| 2022/0024527 A1* | 1/2022 | Knauer ................... | B60R 13/04 |

FOREIGN PATENT DOCUMENTS

| | | | |
|---|---|---|---|
| DE | 10 2019 110 770 A1 | 11/2019 | |
| DE | 11 2019 005 188 T5 | 8/2021 | |
| DE | 10 2020 209 130 A1 | 1/2022 | |
| EP | 3 081 461 A1 | 10/2016 | |
| GB | 2578153 A * | 4/2020 | ............. B62D 37/02 |
| KR | 10-2015-0129254 A | 11/2015 | |

OTHER PUBLICATIONS

German-language German Office Action issued in German Application No. 10 2021 004 207.7 dated Apr. 26, 2022 (6 pages).

* cited by examiner

DIFFUSER DEVICE FOR A MOTOR CAR

BACKGROUND AND SUMMARY OF THE INVENTION

The invention relates to a diffuser device for a motor car, in particular for a passenger car.

A motor vehicle can be taken as known from DE 10 2019 110 770 A1, comprising a body having a front portion, a rear portion and an undercarriage portion. A panel is also provided, which is pivotably coupled with the undercarriage portion neighbouring the rear portion of the body, wherein the panel has a front edge and a rear edge and can be pivoted around the front edge. The panel can be pivoted between a stowed position and a use position.

The object of the present invention is to create a diffuser device for a motor car, such that particularly advantageous aerodynamics of the motor car can be implemented in a manner which is in particular as required.

The diffuser device according to the invention for a motor car, in particular for a passenger car, comprises a diffuser, which is moveably held on a base element of the diffuser device. When fully assembled, the motor car has the diffuser device and a structure, for example designed as a self-supporting body, which delimits the interior of the motor car, also described as a passenger compartment or passenger chamber. The diffuser is, for example, arranged on the rear of the structure, meaning that the diffuser is preferably a rear diffuser. The base element is, for example, a component designed separately from the structure and held on the structure, in particular to the rear of the structure, or the base element is the structure or a component part of the structure. In particular, the base element can be a supporting frame, wherein, for example, the diffuser is held on the structure, in particular to the rear of the structure, by way of the base element.

The diffuser device additionally comprises an actuator, by means of which the diffuser can be moved relative to the base element, and thus also relative to the structure, between a stowed position and at least one use position. The use position is in particular characterized in that, for example, the diffuser extends or protrudes out further from the structure in the use position than in the stowed position. In particular, the use position is characterized in comparison to the stowed position in that, compared to the stowed position, a lift of the passenger car is reduced in the use position, also described as an air guidance position, by means of the diffuser at least in a region in which the diffuser is in the use position, in particular when the motor car is driving forwards. In particular, it is provided that, at least in the use position, the diffuser has or delimits at least one flow cross-section, which is flowed through by air along a flow direction when the motor car is driving forwards. The diffuser or the flow cross-section is designed, at least in the use position, to slow down the air flowing through the flow cross-section or its flow. For this purpose, it is in particular provided that, at least in the use position, the flow cross-section grows larger, i.e., widens, along the flow direction.

It is provided according to the invention that the diffuser has a lower part, also described as a diffuser lower part, which is held on the base element and can be pivoted around a first pivot axis relative to the base element so that particularly advantageous aerodynamics of the motor car can be implemented by means of the diffuser device in a manner which is in particular as required. The diffuser further comprises an upper part, also described as a diffuser upper part, which is held on the base element and can be pivoted around a second pivot axis relative to the base element. The second pivot axis is spaced apart from the first pivot axis. It is preferably provided that the first pivot axis and the second pivot axis run in parallel with each other. It is in particular conceivable that the first pivot axis and the second pivot axis run in parallel with the transverse direction of the vehicle when the diffuser device is in an installation position, wherein the diffuser device takes up its installation position when the motor car equipped with the diffuser device is fully assembled.

The upper part can be moved together with the second pivot axis translationally relative to the base element along a first guide slot provided on the base element. In other words, the upper part, and with it the second pivot axis can be moved, i.e., shifted, translationally along the first guide slot relative to the base element, in order thus to move the diffuser between the use position and the stowed position.

The diffuser additionally comprises an intermediate part, also described as an intermediate diffuser part or blade, which is held on the base element and can be pivoted around a third pivot axis relative to the base element. The third pivot axis is spaced apart from the first pivot axis and from the second pivot axis. It is preferably provided that the third pivot axis runs in parallel with the first pivot axis and in parallel with the second pivot axis. It is thus in particular conceivable that the third pivot axis runs in parallel with the transverse direction of the vehicle when the diffuser device is in an installation position. The intermediate part is shiftably connected to the upper part, in particular via a first guide rail. The intermediate part is additionally shiftably connected to the lower part, in particular via a second guide rail. The intermediate part can thus be shifted relative to the upper part and relative to the lower part between the former and the latter. This should in particular be understood to mean that when the diffuser is moved between the use position and the stowed position, at least a partial region of the intermediate part is shifted between the upper part and the lower part, and relative to the upper part and relative to the lower part, such that, for example, at least the partial region of the intermediate part is pushed through between the upper part and the lower part.

The intermediate part can be moved together with the third pivot axis translationally relative to the base element along a second guide slot provided on the base element. This means that when moving the diffuser between the use position and the stowed position, the intermediate part, and with it the third pivot axis, are shifted along the second guide slot relative to the base element. The upper part, the lower part and the intermediate part are also described in summary as diffuser parts. A forced guidance is created by the guide slots and the pivot axes, and because the intermediate part is shiftably connected to the upper part and shiftably connected to the lower part, by means of which forced guidance a targeted and defined movement of the diffuser parts relative to the base element and relative to one another is caused when the diffuser is moved between the use position and the stowed position. Due to the forced guidance, the intermediate part is shifted relative to the upper part and relative to the lower part between the upper and lower part from a retracted position into an extended position when the diffuser moves from the stowed position into the use position. The intermediate part is shifted relative to the upper part and relative to the lower part between the upper and lower part from the extended position into the retracted position when the diffuser moves from the use position into the stowed position. In the extended position, at least one end edge or a free end of the intermediate part protrudes further from the upper part and the lower part than in the retracted position, such that in the use position, in which the intermediate part is in the extended position, air can be particularly advantageously guided or directed by means of the diffuser when the motor car is travelling forwards. Particularly advantageous aerodynamics of the motor car can thus be implemented in the use position.

In the stowed position, at least one partial region of the diffuser, in particular of the intermediate part, for example comprising the end edge or the end, protrudes less far from the structure or less far from the upper and lower parts, such that during a journey of the motor car, a collision of the diffuser with objects located in an environment of the motor car, and in particular on a road, e.g., a kerb, can be avoided. The forced guidance makes possible a particularly advantageous movability or movement path along which the diffuser can be moved, so that, on the one hand, particularly advantageous aerodynamics of the motor car can be implemented in the use position and, on the other hand, undesirable collisions of the diffuser with objects can be avoided in the stowed position. The forced guidance means that the diffuser can be both pivoted, i.e., for example, folded in and unfolded, and shifted. In other words, when the diffuser is moved between the use position and the stowed position, it carries out both a pivoting movement and a translational movement, i.e., a shifting movement. It is conceivable that the pivoting movement and the translational movement at least partially overlap, or that the pivoting movement and the translational movement are completely connected to each other. It is thus conceivable, for example, that the diffuser is first pivoted, and thus unfolded, and then shifted, and thus in particular extended, in order to move the diffuser from the stowed position into the use position, whereby, for example, the diffuser is lengthened. In order to move the diffuser from the use position into the stowed position, the diffuser is first shifted, and thus retracted, and then pivoted, and thus folded in. Pivoting the diffuser should in particular be understood to mean that the diffuser parts are pivoted around the respective pivot axes relative to the base element. Retracting and extending the diffuser should be understood to mean that in order to extend or while extending the diffuser, the intermediate part is shifted relative to the upper part and relative to the lower part between the former and the latter, and is thus moved into the extended position. In order to retract or while retracting the diffuser, the intermediate part is shifted relative to the upper part and relative to the lower part between the former and the latter, and is moved into the retracted position. For example, in the retracted position, at least one partial region of the intermediate part is arranged between the upper part and the lower part, whereby it is conceivable that, in the extended position, the partial region of the intermediate part is arranged outside of the upper part and of the lower part, and thus is not overlapped by the aforementioned parts. In particular, the partial region is arranged further back in the longitudinal direction of the vehicle in the extended position than in the retracted position.

In the extended position, the diffuser has a longer length running in the longitudinal direction of the vehicle than in the retracted position, whereby the air can be guided particularly advantageously. In the retracted position, and in particular in the use position, the diffuser is small or compact, and for example arranged closer to the structure than in the use position, whereby undesirable collisions of the diffuser with objects can be avoided. The diffuser is, for example, in the use position if the motor car is driven at speeds which are aerodynamically relevant in order to implement an advantageous airflow around the car, in particular around the rear, and thus to reduce the air resistance, in particular in comparison with the stowed position. At low speeds, and thus, for example, when driving in urban areas, the diffuser is preferably in its stowed position, for example to avoid a collision of the diffuser with a kerb, and thus undesirable damage to the diffuser, when driving off the kerb.

The previously described forced guidance makes it possible to realize simple kinematics and, for example, a simultaneous sequence of movements, in particular in the form of the described pivoting movement and the translational movement. In addition, the required installation space and the weight of the diffuser device can be kept particularly low. A simple linking or connection of kinematically overlapping components of the diffuser device can further be achieved. The forced guidance also makes it possible to implement the described movements of the diffuser parts relative to one another and relative to the structure by means of the actuator as the only actuator, such that the use of several, separate actuators can be avoided. In other words, both the pivoting movement and the translational movement of the diffuser can be implemented, in particular in combination with the forced guidance, by means of the exactly one actuator, which is used as a drive to drive and thus to move the diffuser.

In an advantageous embodiment of the invention, the first pivot axis cannot be moved relative to the base element, and is thus fixed to the base element. A particularly advantageous and defined movement of the diffuser parts relative to one another and relative to the base element can thus be implemented, such that, on the one hand, particularly advantageous aerodynamics can be implemented in the use position and, on the other hand, the diffuser requires less installation space in the stowed position.

A further embodiment is characterized in that the first guide slot extends in parallel with the vertical direction of the vehicle when the diffuser device is in an installation position. A particularly advantageous forced guidance of the diffuser parts can thus be implemented, such that the diffuser can be stowed particularly effectively in the stowed position and the air can be guided particularly advantageously in the use position, resulting in particularly good aerodynamics.

So that the diffuser can move particularly advantageously and thus in order, on the one hand, to achieve particularly good aerodynamics and, on the other hand, to be able to stow the diffuser particularly effectively, it is provided in a further embodiment of the invention that the second guide slot has a first longitudinal region which, when the diffuser device is in an installation position, extends obliquely to the vertical direction of the vehicle and obliquely to the longitudinal direction of the vehicle, and preferably in a plane extending through the longitudinal direction of the vehicle and the vertical direction of the vehicle.

It has proved particularly advantageous in this case if the second guide slot has a second longitudinal region which, when the diffuser device is in an installation position, extends in parallel with the longitudinal direction of the vehicle and preferably in the previously specified plane, also described as an x-z plane, extending through the longitudinal direction of the vehicle and the vertical direction of the vehicle. This results in a particularly advantageous forced guidance of the diffuser parts.

In order, on the one hand, to achieve particularly advantageous aerodynamics in the use position and, on the other hand, to be able to stow the diffuser in a particularly space-saving manner in the stowed position, it has further proved advantageous if the first longitudinal region adjoins the second longitudinal region in the longitudinal direction of the vehicle when the diffuser device is in an installation position.

A further, particularly advantageous embodiment provides that the second guide slot has a third longitudinal region, which extends obliquely to the vertical direction of the vehicle and obliquely to the longitudinal direction of the vehicle and obliquely to the longitudinal region when the diffuser device is in an installation position, wherein it is preferably provided that the third longitudinal region extends in the x-z plane. A particularly advantageous forced guidance of the diffuser parts relative to one another and relative to the base element can thus be guaranteed.

It has proved particularly advantageous if, when the diffuser device is in an installation position, the third longitudinal region adjoins the first longitudinal region towards the rear in the longitudinal direction of the vehicle. A particularly advantageous movement course or a particularly advantageous movement path can thus be implemented, along which the diffuser can be or is moved if it is adjusted between the stowed position and the use position. The diffuser can consequently be stowed in a particularly space-saving manner and, in the use position, the diffuser can guide the air particularly effectively.

In a further, particularly advantageous embodiment of the invention, the actuator has a motor, in particular an electric motor, and a spindle, in particular designed as a threaded spindle, which can be driven by means of the motor and can thus be rotated around an axis of rotation relative to the base element. The axis of rotation preferably runs obliquely to or perpendicular to the pivot axes. This should in particular be understood to mean that the axis of rotation runs perpendicular to an axis of rotation plane, which preferably runs obliquely to or particularly preferably in parallel with the pivot axes. In particular, it is preferably provided that the axis of rotation plane runs in parallel with the transverse direction of the vehicle. A particularly advantageous movement of the diffuser can be implemented in a particularly simple and robust manner by means of the motor and the spindle.

It has finally proved particularly advantageous if the actuator is held on the base element such that it can be pivoted around a fourth pivot axis relative to the base element. The fourth pivot axis is preferably spaced apart from the first, second and third pivot axis, wherein it is preferably provided that the fourth pivot axis runs in parallel with the first, second and third pivot axis. It is in particular provided that the respective pivot axis runs in parallel with the transverse direction of the vehicle. Because the actuator is held such that it can be pivoted around the fourth pivot axis, the actuator moves between the use position and the stowed position when the diffuser moves, whereby, on the one hand, a particularly advantageous position of the diffuser, and thus particularly advantageous aerodynamics of the motor car can be implemented in the use position. On the other hand, in the stowed position, the diffuser can be stowed in a particularly space-saving manner, whereby collisions of the diffuser with objects can be avoided.

Further advantages and details of the invention result from the following description and with reference to the drawings.

DETAILED DESCRIPTION OF THE DRAWINGS

Figure 1:
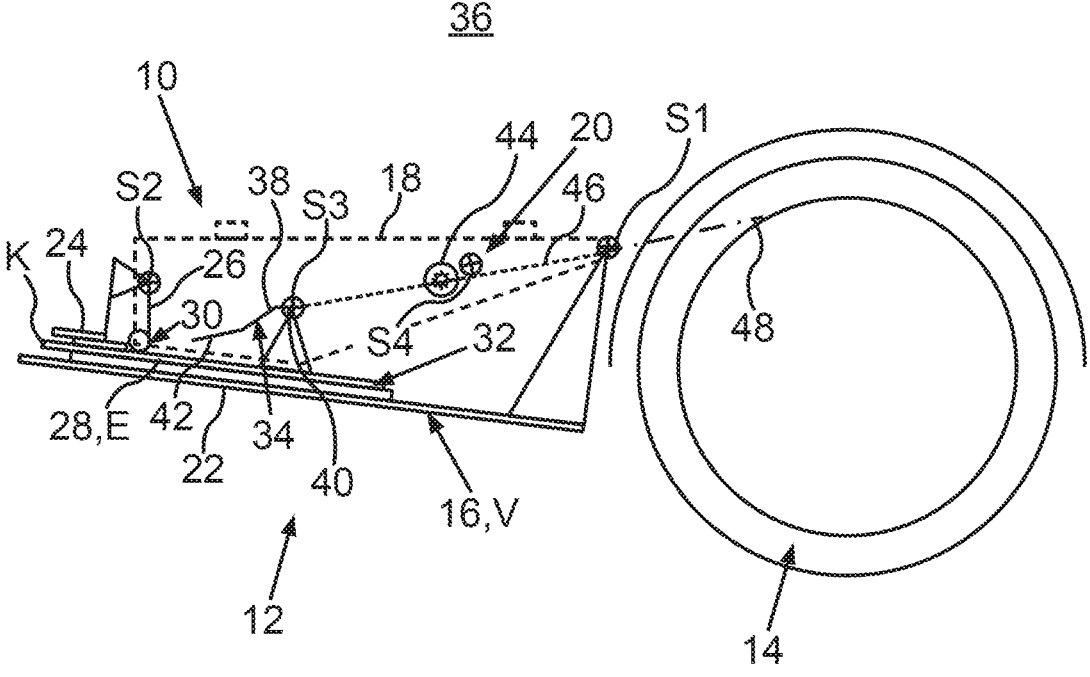
FIG. 1 shows a schematic and sectional side view of a diffuser device for a motor car, having a diffuser which is in its stowed position.

FIG. 1 shows, in a schematic and sectional side view, a diffuser device 10 of a motor car designed as a passenger car. This means that the passenger car has the diffuser device 10, which is arranged on the rear 12 of the passenger car. The passenger car comprises a self-supporting body, which delimits the interior of the passenger car, also described as a passenger compartment or passenger chamber. The diffuser device 10 is presently arranged on the rear 12 of the self-supporting body. The passenger car has exactly two axles arranged following one after the other in the longitudinal direction of the vehicle, wherein each axle has exactly two vehicle wheels spaced apart from each other in the transverse direction of the vehicle and in particular arranged coaxially with each other. A first of the axles is a front axle arranged in front of the other, second axle in the longitudinal direction of the vehicle, such that the other, second axle is a rear axle. In FIG. 1, one of the vehicle wheels of the rear axle can be seen, and is labelled 14. It can thus be seen from FIG. 1 that the diffuser device 10 is arranged behind the rear axle in the longitudinal direction of the vehicle, and is thus arranged behind the vehicle wheels of the rear axle, also described as rear wheels.

The diffuser device 10 has a diffuser 16. Because the diffuser 16 is arranged on the rear 12, the diffuser 16 is also described as a rear diffuser. The diffuser device 10 additionally comprises a base element 18 depicted with dashed lines in FIG. 1, which is designed in the exemplary embodiment shown in the FIG. as a supporting frame. In the exemplary embodiment shown in the FIG., it is provided that the base element 18 is designed separately from the body and is fixed to the body, in particular such that the base element 18 cannot be moved relative to the body. The diffuser 16 is moveably held on the base element 18, such that the diffuser 16 can be moved relative to the base element 18, and thus relative to the self-supporting body, between a stowed position V shown in FIG. 1 and a use position G shown in FIG. 2. The diffuser device 10 additionally has an actuator 20, by means of which the diffuser 16 can be moved relative to the base element 18, and thus relative to the self-supporting body, between the stowed position V and the use position G.

In order, on the one hand, to stow the diffuser 16 in a particularly space-saving manner in the use position V and, on the other hand, to be able to guide air flowing around the passenger car in a particularly advantageous manner by means of the diffuser 16 in the use position G when the passenger car is driving forwards. the diffuser 16 has a preferably rigid lower part 22, which is held on the base element 18 and can be pivoted around a first pivot axis S1 relative to the base element 18. The lower part 22 is a first diffuser part of the diffuser 16. The diffuser 16 further has a preferably rigid upper part 24 as a second diffuser part, which is held on the base element 18 and can be pivoted around a second pivot axis S2 relative to the base element 18. The pivot axes S1 and S2 are in particular spaced apart from each other in the longitudinal direction of the vehicle and run in parallel with each other, wherein the pivot axes S1 and S2 run in parallel with the transverse direction of the vehicle (y direction).

At least one first guide slot 26 is provided on the base element 18. This means that the base element 18 has the at least one guide slot 26. For example, the guide slot 26 is formed in a wall of the base element 18. The upper part 24, and with it the second pivot axis S2, can be moved translationally along the first guide slot 26 relative to the base element 18. For this purpose, at least one first guide element, in particular a first protrusion, is provided on the upper part 24 for example, wherein the first guide element for example engages in the corresponding, first guide slot 26. The upper part 24 is thus guided by means of the guide slot 26 and by means of the first guide element along the guide slot 26 if the diffuser 16 is moved, i.e., adjusted, between the stowed position V and the use position G. In other words, the first guide element, and thus the upper part 24 are moved relative to the base element 18, guided by means of and along the guide slot 26, if the diffuser 16 is moved between the stowed position V and the use position G.

The diffuser 16 additionally has a preferably rigid intermediate part 28, also described as a blade or middle part, which is held on the base element 18 and can be pivoted around a third pivot axis S3 relative to the base element 18. The pivot axis S3 is spaced apart from the pivot axes S1 and S2, and runs in parallel with the pivot axes S1 and S2, such that in the exemplary embodiment shown in the FIG., the pivot axis S3 runs in parallel with the transverse direction of the vehicle. The intermediate part 28 is, for example, shiftably connected to the upper part 24, for example via at least one first guide rail 30. The intermediate part 28 is further shiftably connected to the lower part 22, for example via at least one second guide rail 32. The respective guide rail 30 or 32 is, for example, designed as a linear rail. The intermediate part 28 is a third diffuser part, which is respectively shiftably connected to the first diffuser part and to the second diffuser part. The diffuser parts are thus shifted while guided relative to one another if the diffuser 16 is moved between the stowed position V and the use position G.

A second guide slot 34 is provided on the base element 18, which second guide slot is preferably spaced apart and separate from the guide slot 26. The intermediate part 28, and with it the pivot axis S3 can be shifted along the second guide slot 34 relative to the base element 18. For example, at least one second guide element, in particular at least one second protrusion, is provided on the intermediate part 28, which second guide element engages in the corresponding guide slot 34. The second guide element, and via the latter the intermediate part 28, are thus shifted along the guide slot 34 relative to the base element 18 if the diffuser 16 is moved between the stowed position V and the use position G. While the lower part 22 thus only carries out a pivoting movement around the pivot axis S1 relative to the base element 18 if the diffuser 16 is moved, the upper part 24 and the intermediate part 28 carry out both a pivoting movement around the pivot axis S2 or S3 and a translational movement along the guide slot 26 or 34 relative to the base element 18 when the diffuser 16 moves. In other words, when the diffuser 16 moves, a translational movement of the lower part 22 occurring relative to the base element 18 ceases, whereas the upper part 24 and the intermediate part 28 are both pivoted and translationally moved, and thus shifted, relative to the base element 18.

Figure 2:
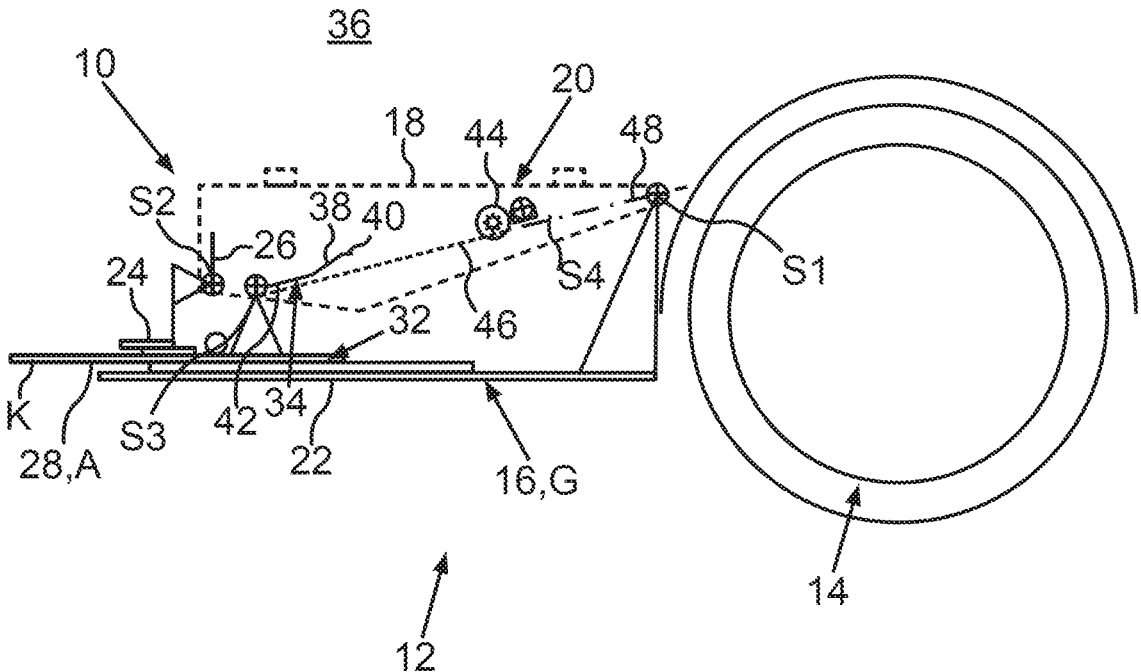
FIG. 2 shows a schematic and sectional side view of the diffuser device, wherein the diffuser is in its use position.

Due to the pivot axes S1, S2 and S3 and due to the guide slots 26 and 34, and because the intermediate part 28 is respectively shiftably connected to the upper part 24 and to the lower part 22, a forced guidance is created, via which the intermediate part 28 is shifted relative to the upper part 24 and relative to the lower part 22 between the former and the latter from a retracted position E shown in FIG. 1 into an extended position A shown in FIG. 2 when the diffuser 16 moves from the stowed position V into the use position G.

The forced guidance further causes the intermediate part 28 to be shifted relative to the upper part 24 and relative to the lower part 22 between the former and the latter from the extended position A into the retracted position E when the diffuser 16 moves from the use position G into the stowed position V.

From FIGS. 1 and 2, it can be seen that in the extended position A, the intermediate part 28 extends further from the first diffuser part and from the second diffuser part or protrudes further from the first and second diffuser part than in the retracted position E. In the exemplary embodiment shown in the FIG., it is provided that, in the retracted position E, the intermediate part 28, in particular an end edge K of the intermediate part 28, is set back relative to the upper part 24 and the lower part 22. In the use position G, and thus in the extended position A, however, the end edge K of the intermediate part 28 protrudes towards the rear beyond the upper part 24 and the lower part 22 in the longitudinal direction of the vehicle. Thus, in the use position G, in which the intermediate part 28 is in its extended position A, air which flows around the passenger car when it is driving forwards can be guided particularly advantageously by means of the diffuser 16, such that particularly good aerodynamics, and in particular a particularly low air resistance of the passenger car can be guaranteed. In the stowed position V, in which the intermediate part 28 is in its retracted position E, the diffuser 16 is particularly compact, such that the diffuser 16 can be stowed in a particularly space-saving manner. In particular, the diffuser 16 has a shorter length running in the longitudinal direction of the vehicle in the stowed position V than in the use position G, and in the stowed position V, at least a partial region of the diffuser 16 is arranged closer to the body than in the use position G. The diffuser 16 can thus be stowed in a particularly space-saving manner in the stowed position V, such that undesirable collisions of the diffuser 16 with objects located in an environment 36 of the passenger car can be avoided.

In the exemplary embodiment shown in the FIG., the first pivot axis S1 cannot be moved relative to the base element 18, and thus relative to the body. In addition, it is provided that the first guide slot 26 extends, in particular completely, in parallel with the vertical direction of the vehicle (z direction) when the diffuser device 10 is in an installation position. The diffuser device 10 takes up its installed position, which is shown in FIGS. 1 and 2, when the passenger car equipped with the diffuser device 10 is fully assembled.

The second guide slot 34 has a first longitudinal region 38, which extends obliquely to the vertical direction of the vehicle and obliquely to the longitudinal direction of the vehicle (x direction when the diffuser device 10 is in an installation position. In addition, the longitudinal region 38 extends in a plane extending through the longitudinal direction of the vehicle and the vertical direction of the vehicle, and also described as an x-z plane. The second guide slot 34 further has a second longitudinal region 40, which extends in parallel with the longitudinal direction of the vehicle and in the x-z plane when the diffuser device 10 is in an installation position. It can be seen from FIGS. 1 and 2 that the first longitudinal region 38 directly adjoins the second longitudinal region 40 towards to the rear in the longitudinal direction of the vehicle, such that no other, further longitudinal region of the guide slot 34 is arranged between the longitudinal regions 38 and 40. In the stowed position V, the intermediate part 28 or the second guide element provided on the intermediate part 28 engages in the longitudinal region 40.

The second guide slot 34 has a third longitudinal region 42, which extends obliquely to the vertical direction of the vehicle and obliquely to the longitudinal direction of the vehicle and obliquely to the first longitudinal region 38. The longitudinal region 42 additionally extends in the x-z plane. It can be seen from FIG. 2 that the intermediate part 28 or the second guide element provided on the intermediate part 28 engages in the longitudinal region 42 in the use position G. The third longitudinal region 42 directly adjoins the first longitudinal region 38 towards the rear in the longitudinal direction of the vehicle, such that no other, further longitudinal region is presently arranged between the longitudinal regions 38 and 42. The longitudinal regions 38, 40 and 42 are connected to one another, such that the intermediate part 28 or the second guide element can be shifted from the longitudinal region 40 into the longitudinal region 38 and from the longitudinal region 38 into the longitudinal region 42 and vice versa when the diffuser 16 moves.

The actuator 20 has a motor, presently designed as an electric motor 44, and a threaded spindle 46, also simply described as a spindle. The spindle can be driven by means of the electric motor 44, and can thus be rotated around an axis of rotation 48 relative to the base element 18. By rotating the spindle around the axis of rotation 48, the intermediate part 28, and with it the third pivot axis S3, can be shifted along the second guide slot 34 relative to the base element 18, whereby the diffuser 16 can be moved between the stowed position V and the use position G. In relation to the specified diffuser parts, the actuator 20 is coupled with the intermediate part 28 and with the upper part 24 and the lower part 22 by way of the intermediate part 28, such that, for example, in relation to the diffuser parts, a force provided by the actuator 20 and intended to move the diffuser 16 is first transmitted to the intermediate part 28, and from the latter to the upper part 24 and the lower part 22.

The actuator 20, in particular the electric motor 44, is presently held on the base element 18 such that it can be pivoted around a fourth pivot axis S4 relative to the base element 18. The fourth pivot axis S4 is spaced apart from the pivot axes S1, S2 and S3, and runs in parallel with the pivot axes S1, S2 and S3. The pivot axis S4 thus also runs in parallel with the transverse direction of the vehicle.

The intermediate part 28 can, for example, be driven by the spindle, and thus shifted along the guide slot 34 relative to the base element 18, such that a screw element, which is for example designed as a nut, is screwed to the spindle, in particular screwed onto the spindle. For example, the screw element is secured against rotation around the axis of rotation 48, so that when the spindle is rotated around the axis of rotation 48, the screw element is moved translationally along the spindle and relative to the base element 18. The screw element is, for example, provided on the intermediate part 28 or coupled with the intermediate part 28, such that if the spindle is rotated, the screw element, and with it the intermediate part 28, are in particular moved along the spindle relative to the base element 18. The intermediate part 28 is correspondingly guided by means of the guide slot 34. As a whole, simple and robust kinematics are created by the forced guidance described, which makes a particularly advantageous, and in particular simultaneous sequence of advantageous movements of the diffuser parts possible. These movements of the upper part 24 and of the lower part 22 are both translational movements and pivoting movements, whereby the lower part 22 only moves rotationally. In addition, the diffuser 16 and the kinematics can be designed in a space-saving and weight-saving manner.

The invention claimed is:

1. A diffuser device (10) for a motor car, comprising:
a diffuser (16) which is moveably held on a base element (18); and
an actuator (20) via which the diffuser (16) is movable relative to the base element (18) between a stowed position (V) and a use position (G);
wherein the diffuser (16) has:
a lower part (22) which is held on the base element (18) such that it is pivotable around a first pivot axis (S1) relative to the base element (18);
an upper part (24) which is held on the base element (18) such that it is pivotable around a second pivot axis (S2) relative to the base element (18), wherein the upper part is movable together with the second pivot axis (S2) translationally relative to the base element (18) along a first guide slot (26) provided on the base element (18); and
an intermediate part (28) which is held on the base element (18) such that it is pivotable around a third pivot axis (S3) relative to the base element (18) and is respectively shiftably connected to the upper part (24) and the lower part (22), wherein the intermediate part (28) is movable together with the third pivot axis (S3) translationally relative to the base element (18) along a second guide slot (34) provided on the base element (18), and is shiftable, when moving the diffuser (16) from the stowed position (V) into the use position (G), relative to the upper part (24) and relative to the lower part (22), between the upper part (24) and the lower part (22), from a retracted position (E) into an extended position (A), and is shiftable, when moving the diffuser (16) from the use position (G) into the stowed position (V), relative to the upper part (24) and relative to the lower part (22), between the upper part (24) and the lower part (22) from the extended (A) position into the retracted position (E).

2. The diffuser device (10) according to claim 1, wherein the first pivot axis (S1) is not movable relative to the base element (18).

3. The diffuser device (10) according to claim 1, wherein the first guide slot (26) extends in parallel with a vertical direction of the motor car when the diffuser device (10) is in an installation position.

4. The diffuser device (10) according to claim 1, wherein the second guide slot (34) has a first longitudinal region (38) which extends obliquely to a vertical direction of the motor car and obliquely to a longitudinal direction of the motor car when the diffuser device (10) is in an installation position.

5. The diffuser device (10) according to claim 4, wherein the second guide slot (34) has a second longitudinal region (40) which extends in parallel with the longitudinal direction of the motor car when the diffuser device (10) is in an installation position.

6. The diffuser device (10) according to claim 5, wherein when the diffuser device (10) is in an installation position, the first longitudinal region (38) adjoins the second longitudinal region (40) towards a rear in the longitudinal direction of the motor car.

7. The diffuser device (10) according to claim 5, wherein the second guide slot (34) has a third longitudinal region (42) which extends obliquely to the vertical direction of the motor car and obliquely to the longitudinal direction of the motor car and obliquely to the first longitudinal region (38) when the diffuser device (10) is in an installation position.

8. The diffuser device (10) according to claim 7, wherein when the diffuser device (10) is in an installation position, the third longitudinal region (42) adjoins the first longitudinal region (38) towards a rear in the longitudinal direction of the motor car.

9. The diffuser device (10) according to claim 1, wherein the actuator (20) has a motor (44) and a spindle (44) which is drivable by the motor (44) and thus rotated around an axis of rotation (48) relative to the base element (18), whereby the intermediate part (28) and the third pivot axis (S3) are shiftable along the second guide slot (34) relative to the base element (18).

10. The diffuser device (10) according to claim 1, wherein the actuator (20) is held on the base element (18) such that it is pivotable around a fourth pivot axis (S4) relative to the base element (18).

* * * * *